United States Patent [19]

Deakin

[11] Patent Number: 4,967,985
[45] Date of Patent: Nov. 6, 1990

[54] AIRCREW RESTRAINT SYSTEMS

[75] Inventor: Richard S. Deakin, Godalming, United Kingdom

[73] Assignee: British Aerospace Plc, London, England

[21] Appl. No.: 199,300

[22] PCT Filed: Sep. 18, 1987

[86] PCT No.: PCT/GB87/00654
§ 371 Date: May 19, 1988
§ 102(e) Date: May 19, 1988

[87] PCT Pub. No.: WO88/01968
PCT Pub. Date: Mar. 24, 1988

[30] Foreign Application Priority Data

Sep. 19, 1986 [GB] United Kingdom ............... 8622560

[51] Int. Cl.$^5$ ............................................. B64D 25/06
[52] U.S. Cl. ............................. 244/122 AG; 244/121
[58] Field of Search ..................... 244/122, 121, 141; 297/216, 464–468, 474, 455; 280/808, 748, 801; 128/133, 134

[56] References Cited

U.S. PATENT DOCUMENTS

| | | | |
|---|---|---|---|
| 2,195,334 | 3/1940 | Lethern | 244/122 B |
| 3,074,669 | 1/1963 | Bohlin | 244/122 AG |
| 3,099,261 | 7/1963 | Doss et al. | 244/122 B |
| 3,178,136 | 4/1965 | Bayer | 244/122 AG |
| 3,918,545 | 11/1975 | Andres et al. | 244/122 B |
| 4,477,041 | 10/1984 | Dunne | 244/122 AG |
| 4,664,341 | 5/1987 | Cummings | 244/122 AG |
| 4,667,904 | 5/1987 | Herndon | 244/122 AG |

FOREIGN PATENT DOCUMENTS 656079 8/1951 United Kingdom .
2163943 3/1986 United Kingdom .

OTHER PUBLICATIONS

"Fast-Jet Aircrew Safety", *Flight International*, Aug. 31, 1985, pp. 25–29.
Flight International, Aug. 31, 1985 (London, GB), J. Farley: "Fast-Jet Aircrew Safety", pp. 25–29, see p. 28, left-hand col., lines 14–39.

*Primary Examiner*—Galen Barefoot
*Attorney, Agent, or Firm*—Cushman, Darby & Cushman

[57] ABSTRACT

An aircrew support system for supporting a pilot's head, and optionally his torso, during high g maneuvers, enabling him to maintain his head in an upright position and thereby increasing his awareness of the situation at all times outside the cockpit comprises at least one head support line (3) adapted for connection between the pilot's head/helmet (4) and the seat (1), accelerometers for measuring the g force acting on the pilot/aircraft and a tension structure for applying a continuously variable tension to said support line of a magnitude determined by the magnitude of the current g force acting on the pilot/aircraft. The support system may include a restraint system, for restraining the pilot in a predetermined position during ejection and for disconnecting the support line on ejection.

9 Claims, 8 Drawing Sheets

AIRCREW RESTRAINT SYSTEMS

This invention relates to aircrew restraint systems and in particular to a head support and restraint system for a pilot of a high speed combat aircraft which is expected to encounter high gravitational (g) forces as it manoeuvres during flight and especially during combat.

A problem encountered during the high speed manoeuvring of an aircraft is the effect of g-forces on the performance of the pilot. When large g-forces are exerted on the pilot's head and body they cause involuntary movements which can have serious consequences particularly during the critical moments of a manoeuvre. For instance the pilot of an aircraft in a tight high speed turn, perhaps pursuing another aircraft, can experience his head being forced downwards by a g-force several times greater than the force of gravity at the very moment when he needs to look directly ahead or upwards. The use of accessories such as night sights which bolt onto a pilots helmet increase the weight of and accentuate the effects of these g-forces on his head. Apart from the immediate dangers of involuntary movements occurring during a high speed manoeuvre the cumulative effects of g-forces on the pilot's head and body cause pilot fatigue which also impairs pilot performance. It would therefore be to a pilot's advantage if the effects of high g-forces could be compensated for or reduced in some way.

The idea of a head restraint system for military aircrew is not new. The idea was first considered by Sir James Martin (see "Fast Jet Aircrew Safety"—J. F. Farley, Flight International Magazine, page 25 to 29 31st Aug. 1985) for high speed escape reasons in the early 1960's, but the idea has never been seriously considered as an aid to the pilot during high g manoeuvres.

Head restraints such as the one described by Rockwell in G.B. No. 2,163,943A are known which restrain the lateral movement of a pilot's head during the moments of a high speed manoeuvre while allowing the pilot to move around freely during more usual flight conditions. The Rockwell patent discloses an arrangement in which a pilot's head is laterally restrained by means of cables attached to his helmet and ejector seat. During ordinary flight conditions the pilot is able to move his head around freely because the cables wind to and from inertia reels attached to the ejector seat to give the pilot a sufficient amount of freedom of movement. When manoeuvering, however, such that g-fources exerted on the pilot exceed a predetermined threshold value, the inertia reels lock and prevent the restraint cables and thus the pilot's head from moving any further. The pilot's head is then locked in whatever position it was before the manoeuvre began. A disadvantage of this arrangement is that although it prevents involuntary head movements it also precludes the possibility of the pilot making voluntary movements, i.e., the pilot is unable to turn his head to look around until the aircraft has pulled out of the manoeuvre and the g-forces have fallen below the predetermined threshold value and the inertia reels unlock once more.

The problem is to prevent the pilots head from falling forward during high g manoeuvres caused by an increase in the bending moment about his head due to an increase in the apparent weight thereof associated with the increased g-force.

It is an object of the present invention to provide apparatus for supporting a pilot's head during high 'g' manoeuvres, enabling him to maintain his head in an upright position thereby increasing his sense of awareness of the situation outside the cockpit.

It is a further object of the invention to provide apparatus for restraining a pilot's head during an escape ejection, thereby reducing the dangers of spinal injury.

According to one aspect of this invention there is provided a support system for a pilot of a high speed aircraft, said system comprising at least one head support line connected between the pilot's head and a point on the aircraft structure, means for measuring the g-force acting on the aircraft and tension means for applying a continuously variable tension to said support line of a magnitude determined by the measured g-force acting on the aircraft.

Preferably the support system further includes at least one body support line connected between the pilot's body and a point on the aircraft structure and the tension means is arranged to apply a continuously variable tension to said body support line of a magnitude determined by the measured g-force acting on the aircraft. The support system may then include means for measuring the angle between the pilot's body and his seat and for adjusting the tensions in the support lines by an amount dependent on the measured angle. Advantageously the support system monitors the prevailing g-forces acting on said aircraft and calculates the tension required in said support lines to off-set the forces on the pilot's head or body.

Preferably said tension means applies a tension to said support line such that increases in weight of the pilot's head, above a pre-determined level of g-force are counterbalanced by the head support system, so as to maintain a balance of forces at which the pilot can move his head freely.

By using apparatus according to the invention the pilot is able to move his head in an unrestrained way under all flight conditions. During high-g manoeuvres in particular the support system applies a supporting force to the pilot's head and body which is proportional to the g-force acting on the pilot. The supporting force is applied in such a way that the resultant force on the pilot's head is equivalent to the force which would be experienced under more usual flight conditions, for example 1 g.

An advantage of the present arrangement is that it prevents involuntary movements of the pilot's head while at the same time making it possible for the pilot to make voluntary movements and maintain a greatly improved level of awareness of his surroundings. The pilot is able voluntarily to move and hold his head in a steady position in conditions in which he would otherwise be unable to do so because the g-forces are too great. The support system also reduces the load on the pilot's head throughout the flight and alleviates pilot-fatigue.

Further advantages of the invention are that the support helps prevent neck injuries caused by sudden increases in the rate of change of g-forces during abrupt and often unexpected aircraft manoeuvres, it helps to reduce the possibility of impact injury to the head as a result of g-forces induced loss of consciousness (GLOC) and that by careful design of the final arrangement of the system it is possible to use the head support cable to restrain the pilots head on ejection, thereby preventing cervical neck injuries due to incorrect alignment of the spine during an ejection sequence. The latter, however, is not the primary object of the invention. The invention is not restricted to support systems having a threshold of operation of 1 g and experiments may show that it is better to set the threshold level nearer 2 or 3 g which could still provide significant head support under the higher g loads but would require a greater physical contribution from the pilot in order to keep his head up at these higher g loads. The actual threshold level chosen and the amount of support that the system will be designed to provide may be determined by a knowledge of the maximum compressive forces that the cervical spine and basel skull area can support before the likely onset of any appreciable discomfort.

The design of the head support system must be such that is it as unobtrusive as possible both in terms of weight and size when connected to the pilot so as not to physically impair his normal envelope of movement. Moreover the support system must not restrict the pilots field of vision.

If the head support system is to be combined with a head restraint system for safer high speed ejection escape, as suggested above, care must be taken to ensure that its speed of response at the initiation of the ejection sequence is such that the pilot is not left in a partially retracted, leaning forward, state as he and the seat leave the aircraft.

The design of the support system must also provide ease of connection and disconnection of the pilot from the system, comfort and safety of use and nuclear, biological and chemical clothing compatibility.

A specific embodiment of the invention will now be described by way of example only in which:

FIG. 1A shows an inset with a triangle of forces used to resolve tension on the support cable;

FIG. 9 shows detail of the helmet connecting bracket of FIG. 3, in which

Figure 1:
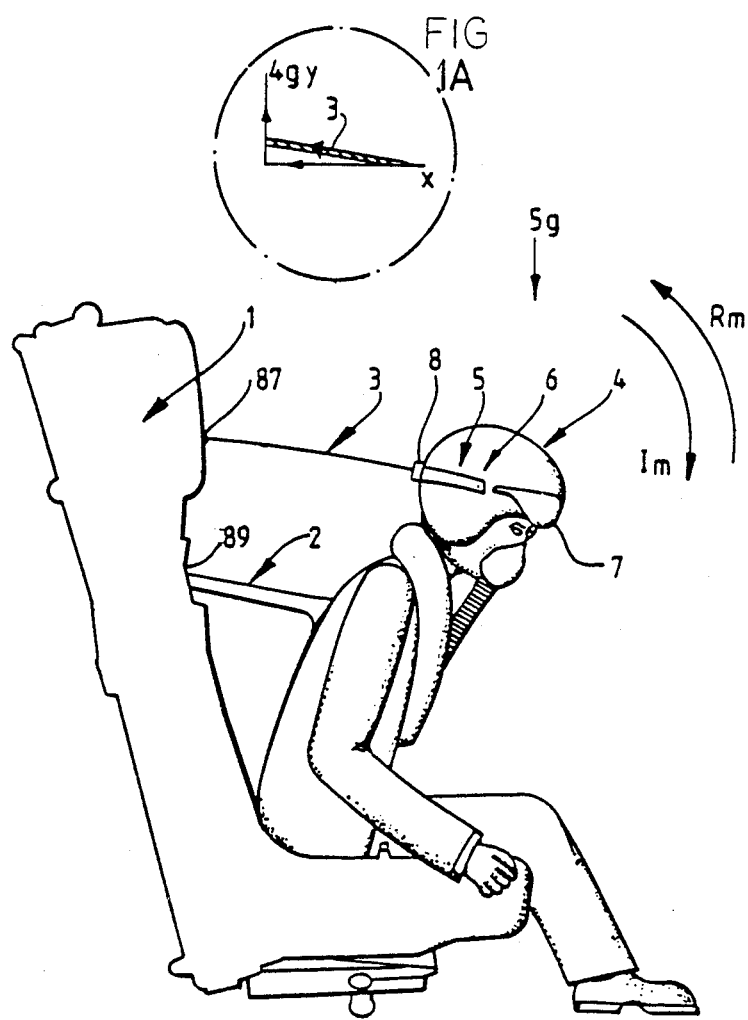
FIG. 1 is a side view of a pilot sitting in an ejector seat which incorporates a head and body support system according to the invention.

Referring to FIG. 1 a pilot is attached to an ejector seat 1 by body and head support cables 2 and 3 respectively and by other conventional leg restraints and lower negative g strap (neither of which are shown). The cable 3 is under tension during high g manoeuvres and provides a restoring moment Rm to the pilots head to counteract the g induced moment Im allowing the pilot to look whilst the lower cable 3 offers a restoring moment to the pilots torso. The shoulder restraint straps of a conventional system are not required as they are effectively replaced by the body support cables 2.

The cables 2 and 3 serve two purposes. They apply a supporting force to the pilot's head and body and they also enable the position of and attitude of the pilot's head and body to be monitored as he moves around in the cockpit. The body support cable 2 is attached to the pilot's torso by means of a harness (not shown) at a point midway down his back and prevents the pilot being pulled back by his head alone and ensures that his head is not pulled too far back relative to his body by the support system. Both cables 2 and 3 are attached to cable drums or pulleys 11 and 12 (FIG. 4) which wind in and out together to support the pilot in a suitable posture. A piston 9 and pulley arrangement (see FIG. 4) acts as a damper to smooth the effects of sudden changes of tension in the cable 3. The piston 9 and pulley arrangement also enables the length of the head restraint cable 3 to be adjusted independently of cable 2 so that the pilot is still able to move his head independently of his torso despite being supported. The piston 9 also has a position sensor incorporated in it which monitors the extra amount of head support cable which has been unwound due to the movement of the pilot's head relative to his body and signals this information to control unit 15.

Figure 2:
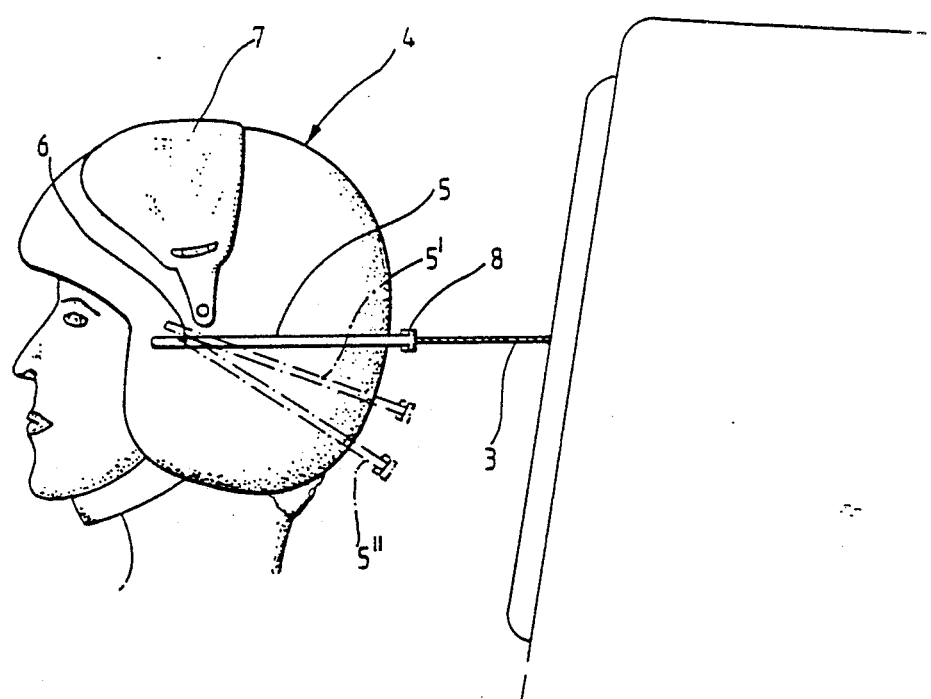
FIG. 2 is a side view of a pilot's helmet adapted for use with the head and body support system of FIG. 1.

Head support cable 3 is attached to the pilot's helmet 4 by means of a clasp 8 slidably mounted on racket 5 which is pivotally mounted to the helmet 4 so that the pilot is able to rotate his head, move it from side to side and to raise and tilt it backwards and forwards. FIG. 2 shows the horseshoe shaped bracket 5 mounted on a pivot 6 at each side of the helmet. The pivots may be specially placed on the helmet or else existing pivot points, such as those provided for the helmet visor 7, may be used. The pivoting action of the bracket 5 enables the pilot to tilt his head. The dotted outlines 5' and 5" show the possible successive positions of the bracket as the pilot tilts his head forward. The pivot points 6 may also be mounted on slotted brackets on the other side of the helmet, (not shown), that the bracket 5 can be moved up and down the helmet to compensate for changes in the centre of mass of a pilot's head. These changes may be due to physical differences between pilots or to equipment such as a night sights attached to the helmet.

Figure 3:
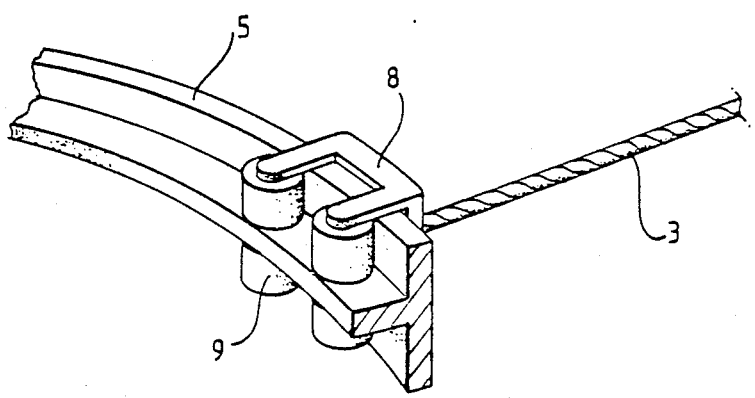
FIG. 3 is an enlarged view of a helmet connecting bracket and slide arrangement for the helmet shown in FIG. 2.

It will be seen in FIG. 3 that the clasp 8 has a series of roller bearings 9 mounted on it so that it can slide around bracket 5 and enable the pilot to rotate his head while the cable 3 is under tension.

Figure 9A:
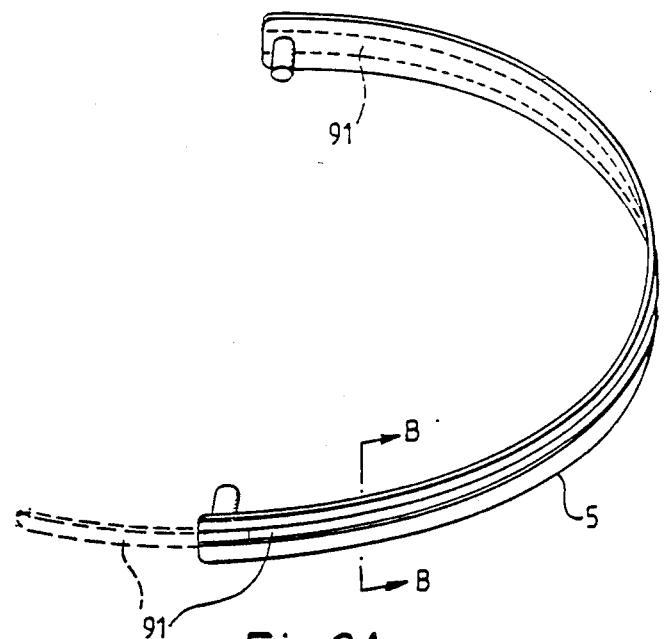
FIG. 9A is a perspective view of the bracket.
Figures 9B, 9C:
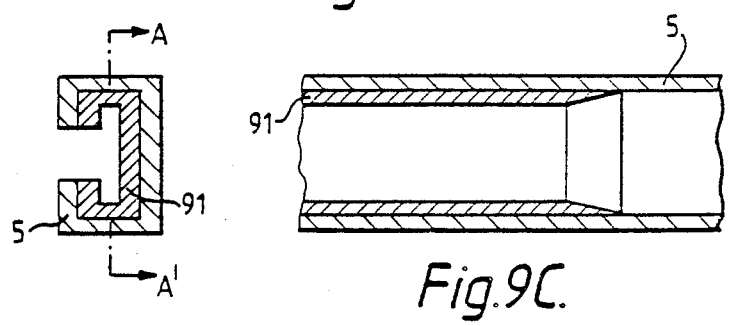
FIG. 9B is a section view on the line B—B' of FIG. 9A.
FIG. 9C is a section view on the line A—A' of FIG. 9B in one position of operation.
Figure 9D:
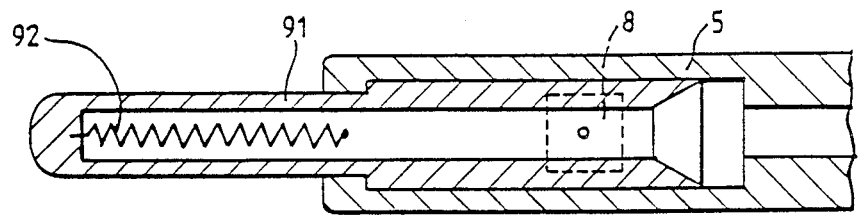
FIG. 9D is a section view on the line A—A' of FIG. 9B in a second position of operation.

FIGS. 9 A-D show an alternative helmet bracket in more detail. An inner sliding rail 91 which would normally be held in a central position by two springs 92, but when pulled by the head support cable, can slide out from the main runners to enable the pilot's head to be supported when looking around at angles greater than 90°.

Figure 4:
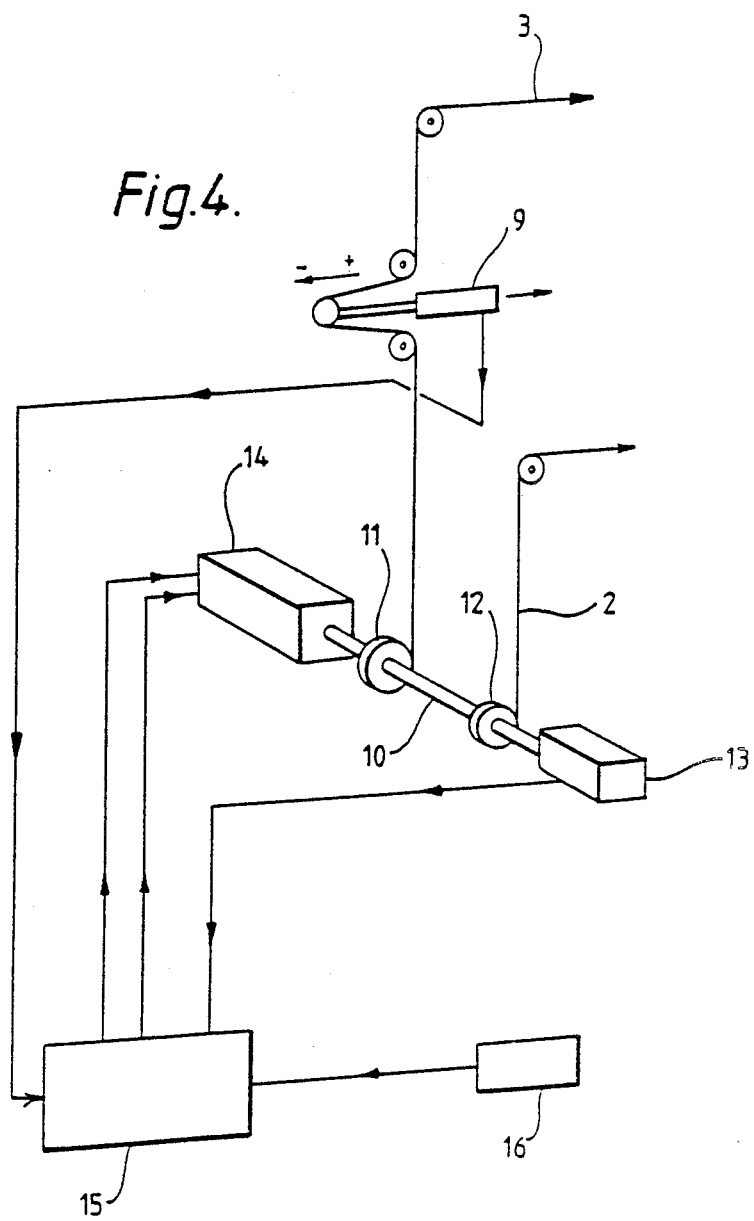
FIG. 4 is a schematic diagram of a tension monitoring and control system for the head and body support system shown in FIG. 1.

The tension in cables 2 and 3 is monitored and controlled by the system shown in FIG. 4. The restraining cables 2 and 3 are wound on to pulleys 12 and 11 respectively on a common shaft 10. Shaft 10 has an angular position sensing unit 13 for example an optical shaft encoder at one end and a drive motor 14 at the other end. Both the position sensing unit 13 and motor 14 are connected to a microprocessor control unit 15 which calculates the appropriate amount of tension required in cables 2 and 3. The control unit 15 also receives data representing g-forces from an accelerometer 16 and using that data and data from the position sensor 13 and it calculates the amount of supporting force required to counter the current g-force on the pilot's head and body. Control unit 15 sends appropriate torque control signals to the motor 14 which drives the shaft 10 and winds the support cables 2 and 3 onto pulleys 11 and 12 and pulls cables 2 and 3 to their correct tension. Accelerometer 16 is placed in the cockpit in a position close to the pilot so that during manoeuvres in which the aircraft is subject to g-forces which vary depending on the position on the aircraft at which they are measured, the g-force data it transmits to the control unit 15 more accurately represents the g-force actually acting on the pilot.

During normal flight, the pilot is subject to a force of 1 g, the motor 14 does not apply any supporting force to cables 2 and 3 and the pilot is free to move around as if he was not actually wearing the support system. The system does however apply a minimum amount of force necessary to keep the support cables taut and prevent the cables from becoming slack whenever the pilot moves back in his seat. It can be seen from FIG. 1 that as the pilot leans forward a greater length of head support cable 3 has to unwind off shaft 10 than that of torso support cable 2. Similarly when the pilot moves back into an upright position, a greater length of head support cable 3 will have to be wound back onto the shaft 10 than of the torso support cable 2. Accordingly the two pulleys 11 and 12 maybe of different diameters so that they can wind and unwind appropriately different lengths of cable as the pilot leans forward or backward. The larger diameter of pulley 12 enables it to release and wind in in torso cable 2 and a proportionally greater length of head restraint cable 3 at the same time whilst maintaining the tension in both as determined by the control unit 15.

There are several types of piston actuators 9 on the-market which could make the system feasible. The first type are servo-hydraulic actuators similar to he type used in 'fly-by-wire' systems, and provide a fast operating response and powerful piston force. The second type are electrically operated.

Servo-hydraulic pistons suffer from one major disadvantage if they are to be mounted on the seat, and that is the problem of the disconnection of the hydraulic supply at the start of an emergency ejection. To overcome this problem, the pistons and their associated hydraulic controls may be mounted off the seat. Means (not shown) are provided to clamp the two cables 2 and 3 from a location on the seat, once they were in a retracted position as the seat left the aircraft. This could be achieved by initially letting the cables run back through the seat at thestart of the ejection sequence so that as the seat left the aircraft the pilot was pulled into an upright position (if required); the cables being detached from the aircraft and clamped on the ejection seat once this had been completed. However, with the speed of current ejection seats which are clear of the aircraft within 0.25 secs of the pilot pulling the ejection hangle, this would mean that the pilot would be brought back into an upright position very rapidly, and may injure his head in the process as it collided with the seat's head box; the impact speed being limited to a maximum of about 8 ms−1. However, the pistons can respond rapidly to any required load changes, and could provide a suitable speed of response to enable good control during normal flight. This problem of the restraint during the ejection may be overcome by use of the alternative embodiment discussed below.

Figure 5:
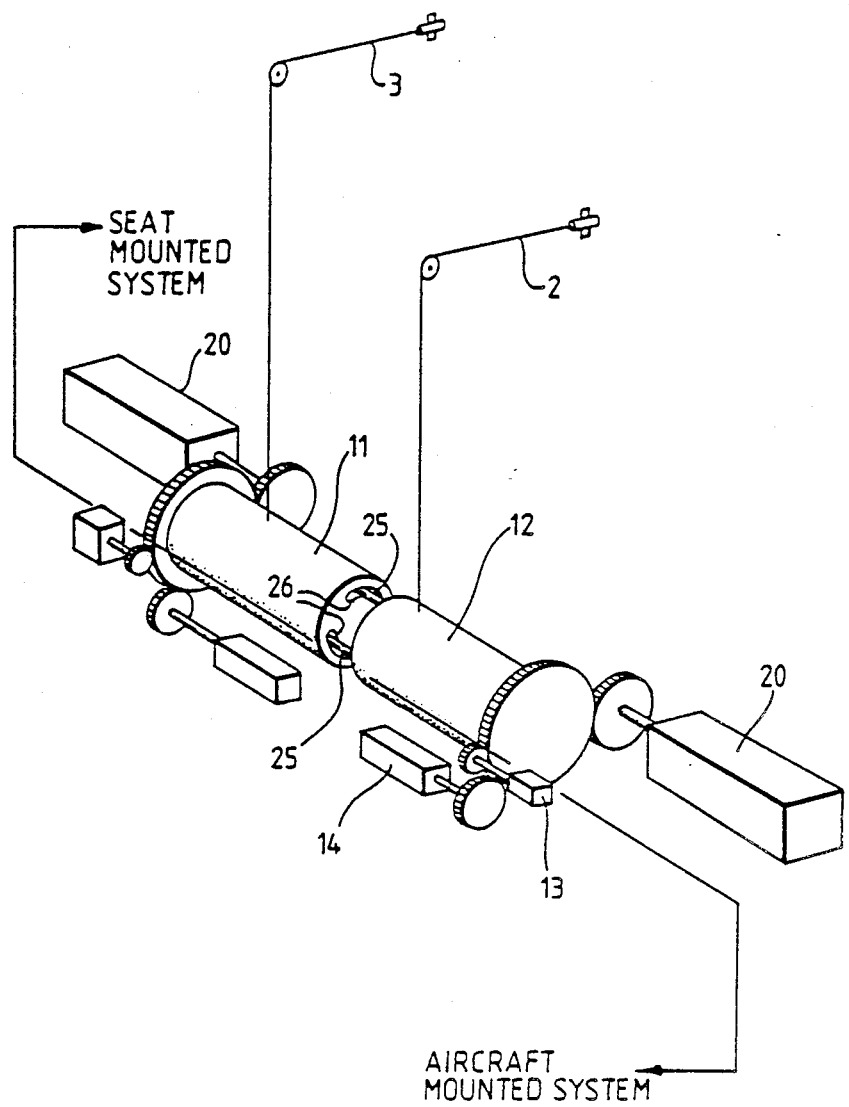
FIG. 5 is a schematic diagram of a further form of tension monitoring and control system for the head and body support system of FIG. 1.

Alternatively, and as shown in FIG. 5 the drums 11 and 12 are of similar diameter but are powered independently by independent stepper motors 14. The cables and the cable drums are mounted on the ejection seat and do not degrade the seats performance as they are made from lightweight materials. The drive system for the drums, i.e., stepper motors 14 and gearing is mounted off the seat and is attached to solid structure such as the rear cockpit bulkhead. The advantage of this system compared with that of FIG. 4 is that during an ejection sequence the drive wheels of stepper motors 14 and drums 12 and 11 simply move apart as the seat leaves the aircraft. This leaves the cable drum free to be wound by a power retraction system 20 as shown in FIG. 5, either to bring the pilot into an upright position, or to wind the cables back onto the drums to prevent them flailing during the ejection. The stage at which the cables are detached from the pilot will depend on the angle at which the pilot is leaning forward at the start of the ejection.

When deciding on the choice of system, one very important factor will be the additional weight that the system adds to the ejection seat. This would need to be kept to a minimum if was not to degrade the performance of the ejection seat. From the design studies carried out to date, the cable and drum system of FIG. 5 would seem to have an advantage over the servo-hydraulic system of FIG. 4 in terms of weight, and also to a lesser extent in size.

During high speed manoeuvres the accelerometer 16 detects the presence of high-g conditions and sends appropriate signals to the control unit 15. The control unit is arranged so that it only operates the system when a pre-set threshold of g-force has been exceeded. The threshold in this case is set at just over 1 g and when the accelerometer 16 detects a force greater than this threshold e.g. the force of 5 g shown as acting in a direction vertically downwards on the pilot's head in FIG. 1, the control unit 15 will signal motor 14 to apply a counteracting supporting tension to the support cables 2 and 3 i.e. in this example to produce a vertical component of force of 4 g in a vertically upward direction so that the resultant force on the pilot's head remains at 1 g in the downward direction. Because the support cable 3 is attached to the back of the pilot's helmet and not to a point directly on the top of the helmet the support force is applied to the pilot's head in a line of action acting through his brow and forehead. This is safer and more comfortable than as would happen if the helmet was pulled from directly above, the pilot's head was pulled up by the chin straps, which could result in the pilot being choked. FIG. 1A the triangle of forces used to resolve the tension in the support cable 3 and shows that tension in the cable resolved as a horizontal component X and a vertical component Y. It can be seen from FIG. 1A that the tension required in the support cables to produce the force of 4 g necessary to counter the 5 g-force on the pilot will vary with his angular position with respect to the ejector seat. In particular the tension required in the head support cable 3 will vary with the angle of inclination of the pilot's head. The tension is adjusted by the control unit 15 and the torque motor 14 such that $Y = 4$ g. The position sensor 13 enables the angle at which the pilot is sitting to be calculated from the number of revolutions of shaft 10. The angle of the pilot's head with respect to his torso is then found from the lateral position of in piston 9 which is a measure of the extra length of cable 3 released or wound in by movement of the pilot's head relative to his body. This positional information is then passed to control unit 15 where the adjustment to the tension needed to produce the required vertical component of force is calculated.

Ideally, to minimise the tension required, the head support cable 3 is suspended from a point vertically above the pilot's head so that the cable 3 subtends the smallest possible angle from the vertical. However in an aircraft it is not practical to attach a support cable to the canopy at a point directly above a pilot's head for obvious reasons, i.e. the canopy would be stressed by the weight of pilot's head. Furthermore there is not enought room between the pilot's head and the aircraft canopy in a small fighter aircraft to introduce a beam or support directly above the pilot's head. The present arrangement compromises by attaching the head support system to a convenient point high on the ejector seat, taking into account the effects of pilot posture.

Figure 6:
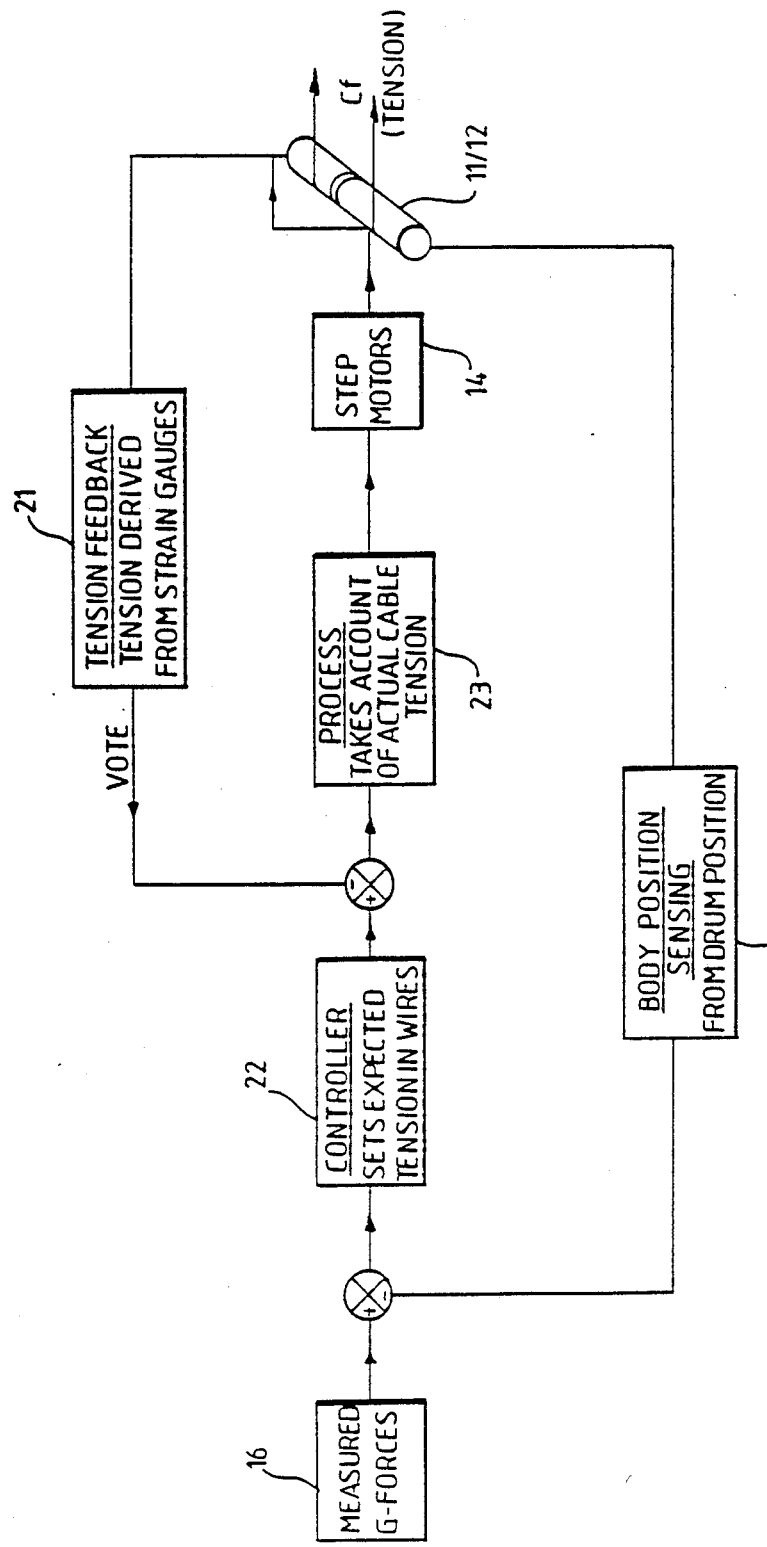
FIG. 6 is a block schematic circuit diagram of a control system for use with the system of FIG. 1.

FIG. 6 shows the closed loop system necessary to control the tensions of cables 2 and 3. It is based on the servo mechanism principle, i.e., 'a closed loop system in which the controlled loop is a mechanical position or rate' and assumes that the servo output is to an electric motor or step motor 14 used to power the cable drums 11 or 12. A suitable motor 14 for this arrangement could be powered from a 400 cycle AC supply or 28 volts DC supply, such as already exists in most modern military aircraft. The control loop comprises means 21 for providing tension feedback in which the tension in cables 2 or 3 are derived from strain guages (not shown) mounted on woven into cables 2 or 3 adjacent to the torso harness and the 'horseshoe' helmet attachment points respectively. Tension feedback signals from the tension feedback means 21 are combined with signals from a controller 22 which sets the 'expected' tension in cables 2 and 3. The combined signals are processed in processor 23 to take of actual cable tension and produce control signals for stepper motor 14. A body position sensing circuit 24 calculates body position from the position of the appropriate cable drum 11 or 12 and combines this with accelerometer 16 signals to provide inputs to the controller 22. The system has certain properties:

(a) In a null condition the tension in a cable 2 or 3 is equal to that demanded by the system controller 22.

(b) The polarity of the signal from the processor 23 determines the direction in which the drum 11/12 needs to be turned. The driving mechanism therefore needs to be able to be driven from either direction to the null position. A suitable system would be a digitally controlled step motor 14 which is capable of turning small increments in either direction.

When the required tension in the system has been determined from the g-forces, body position and tension feedback signals the motor 14 turns the cable drum 11/12 via a series of suitable cogs. This has the effect of increasing (or decreasing) the tension in the cables as required. The new tension level is then fed back into the system and a new signal sent to the motor as to whether it should continue to turn to increase the tension, stop if the tension in the cables is the tension required or unwind if the tension is too great. In the event that the pilot has selected the seats 'go forward' lever in the locked position to prevent him from leaning any further forward, the weight of his torso will be supported by the standard harness shoulder straps if fitted. In this position support will be provided for the pilots head by the head support cable 3. The cable drums 11 and 12 each have a longitudinally extending arm 25 co-operating with arcuate slots 26 in the respective other drum and by means of which dums 11 and 12 are interlocked with limited but sufficient movement to permit independent head and torso movements (see FIG. 5). By controlling the tension in the head support cable 3 in this way should any system failure occur then the relative movement of the two drums 11 and 12 and hence the two cables 2 and 3 will be limited and will therefore prevent any overstraining of the pilots neck. If the 'go forward' lever is selected 'locked', then the cable drum 11 will also lock in position but will wind in as the pilot sits upright. With the 'go forward' level in the unlocked position full support will be provided to both the head and torso by the control system. In the unlocked case the weight of the pilots body will be entirely supported by the torso support cable 2.

Figure 7:
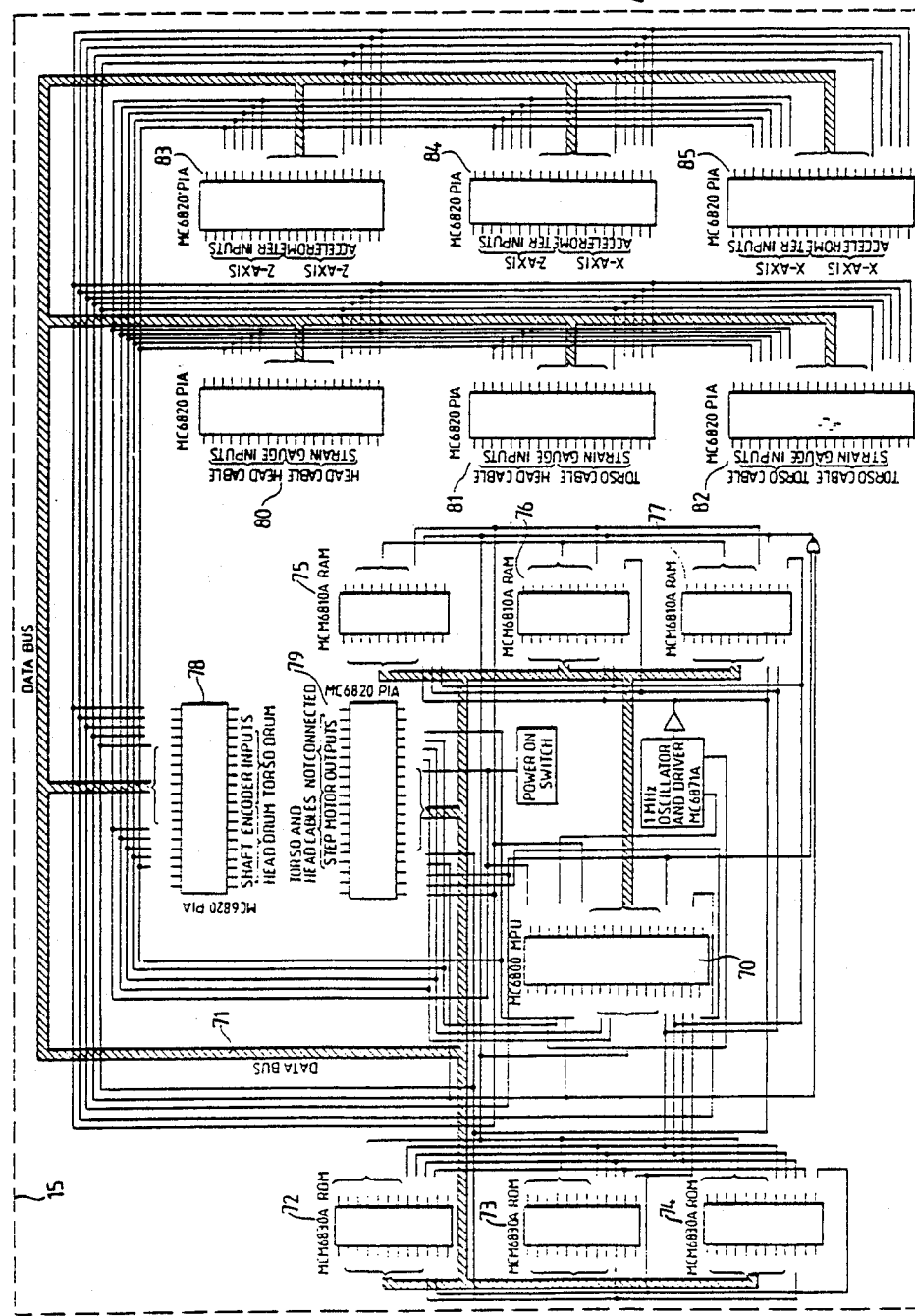
FIG. 7 is an electronic circuit diagram of a microprocessor control unit for use with the system of FIG. 1.

FIG. 7 shows a typical microprocessor control system suitable for controlling the operations of the head support systems of FIG. 1. The microprocessor system is based around the M6800 Micro-computer family which uses a 16-bit address bus, and an 8-bit data bus. It is capable of operating at clock speeds up to 2 MHz and is powered by a 5 volt DC power supply.

The central unit of the microprocessor system is the microprocessor unit (MPU) 70. This controls the operation of the system and generates all addresses placed on the address bus. When the MPU 70 generates and address only the device with that address will communicate with the MPU.

The 8-bit data bus 71 is common to all devices in the system and permits communication of data between the MPU and one of the following units addressed on the address bus:

(a) Read only memories 72, 73 and 74, (b) Random excess memories 75, 76 and 77 and, (c) Peripheral interface adaptors 78 (shaft encoder inputs for head drum and torso drum), 79 (step motor outputs for torso and head cables) 80, 81 and 82 (torso and head cable tensions) and 83, 84 and 85 (forces measured by accelerometer).

The microprocessor control unit shown in FIG. 7 is configured to perform the operations of the system shown in FIG. 6. The actual program which the MPU 70 follows in order to control the peripheral devices such as the step motors 14 is contained in the three read only memory units 72, 73 and 74. These units could be replaced by eraserable programmable read only memories which can be programmed and then realtered as the program is refined. The three random access units 75, 76 and 77 are used by the MPU during the execution of the main program for the temporary storage of data. The seven peripheral interface adaptors 78 to 85 act as interface units for information entering the system from accellerometers 16, optical shaft encoder sensors 13, cable drums 11 and 12 and strain guages (not shown) mounted on each support cable 2/3. Information output from the system is to the 2 step motor drive chips 79, which will control the operation of the 2 step motors 14 one mounted on the gearing to each of the two cable drums 11 and 12.

The optical shaft encoders 13 that interface with the peripheral interface adaptors 78 have two different sets of information associated with each one. One set is from a binary counter (not shown) which reads the shaft and counts the number of pulses outputed from the device, whilst the second set of information relates to the direction in which the shaft is turning. Both sets of information will be fed into the allocated side adaptor 78 at the same time, when adaptor 78 is commanded to 'read'. The information will then be interpreted by the program as two sets of data, from which it can calculate the amount of cable that has wound in, or unwound from each drum (11 or 12).

Some of the input devices such as the strain gauges will need several forms of signal conditioning before the signal is fed into an Analog-to-Digital converter (not shown). The A-D converter used in this design requires an input of 0 to +10 V, or from 0 to +20 V. Due to the small nature of the signals from the strain gauges, the first of these options would be the most sutiable. To achieve this, the signal would need to be passed through an operational amplifier, and possibly a voltage level translator to ensure that maximum strain in the cables, allowing for a safety factor of about 1.5, produces an output of 0-+10 volts. The operational amplifiers for each set of two sets of three strain gauges would need different gain characteristics to produce the required output due to the differing levels of maximum tension likely to be experienced in each of the cables. Each indiidual strain gauge would need to have its output passed through a separate A-D converter before being passed to the peripheral interface adaptor input lines 80, 81, 82, and may also initially require some form of noise filtering before being passed to the A-D converter.

A similar amplication and voltage level translation will also be necessary for the acceleromters 16. Again, each accelerometer 16 will require its own noise filter, and A-D converter before being passed to the Peripheral Interface Adaptor 83, 84, 85 input lines.

The only outputs from the adaptors will be that from 79 to control the operation of the step motor 14. Each step motor driver device requires only three inputs, (input, direction and reset), and because of this, both step motor driver chips can be connected to the same side of one adaptor 79.

The information input and output to the adaptors 78-85 is summarised below.

The steps that the program will follow during its execution are as follows:
ON POWER UP
(a) Initialise the output from the strain gauges to zero.
(b) Initialise the cable
(c) Initialise the output from the accelerometers 16 to zero.
MAIN PROGRAM
1. Measure the tension from all strain gauges in both cables 2 and 3. Compare all three readings and if they are all within 5% of each other, take the mean reading. If one reading is outside this margin, signal this to an adaptor, CA output line, which will then trigger an LED to indicate the failure on a display panel within the cockpit. The program continues using the information ram the remaining two transducers. If there is no tension in either of the two cables 2 or 3 command the step motors 14 to take up any slack.
2. Read the three Z-axis accelerometers 16. Compare all three readings and if they are all within 5% of each other, take the mean reading. If one reading is outside this margin, signal this to an adaptor CA output line, which will then trigger and LED to indicate the failure on a display panel within the cockpit. The program continues using the information from the remaining two transducers.
3. Read the shaft position encoders 13 and convert this information into the length of cable from each drum 11 and 12 that has payed out, and hence the angular position of the pilot's head and torso.
4. Check to see if the 'go forward' level is in the forward (harness free to move in and out), or back, (harness cannot extend but retracts in when with pilot sitting upright).
IF 'GO FORWARD' LEVER IS FORWARD
5. From the g forces and the measured torso, and head position found in steps 2 and 3, calculate the tension that should be in both the support wires 2 and 3. If this is less than expected, assume that the pilot is trying to hold his head up, and command the step motor 14 to slowly wind in the head support cable 3 until the cable tensions return to a level that the system 'expects to see'. If the tension is more than xpected, command the step motor 14 to slowly unwind the head support cable 3 until the cable tensions return to a level that the system 'expects to see'. 'More or less than expected' would again have to be within a percentage margin or fixed value of the expected figure. This would require the pilot to make a positive action when he wishes to lower or raise his head.
6. If the tension in the cables is within he bandwidth expected, then the program moves tõ step 7.
7. Read the strain gauge inputs from both cables. Perform a similar voting arrangement to that carried out in step 2 to determine the tension in both cables.
8. Subtract the measured tension levels fromt he 'expected', calcuated tension levels, and command the step motors to decrease or increase the tension levels to bring them in line with those calculated by the program.
9. Return to step 1.
IF 'GO FORWARD' LEVER IS BACK
10. If the lever is in the 'back' position, then the torso harness will support the pilot's torso without the need for any additional support from the torso support wire. Similar calculations are performed as previously, but the step motor controlling the torso support cable is not commanded to step up or down unless it is required to keep within he limits that relate the angle of the torso cable drum 12 to that of the head cable drum. 11.
11. Return to step 1.

Figure 8:
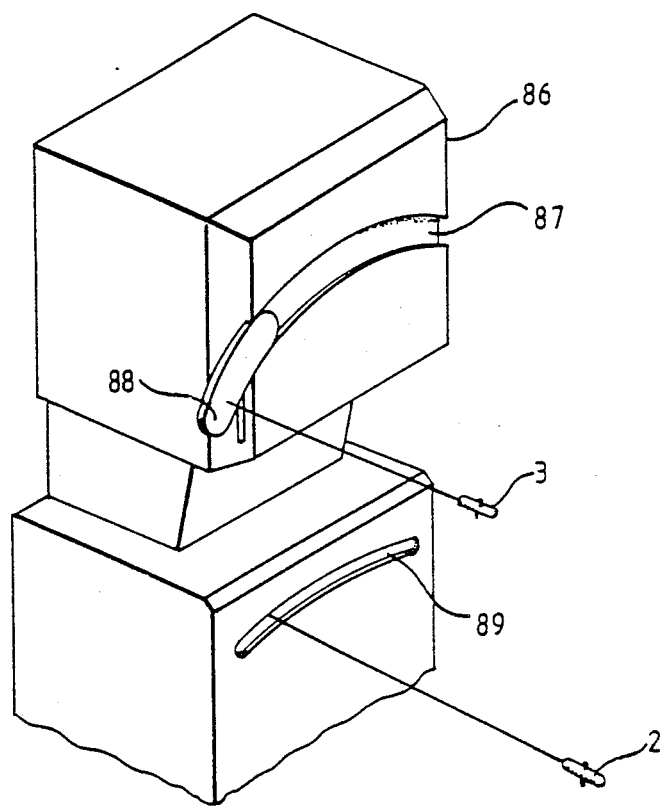
FIG. 8 is a perspective view of part of an aircraft seat adapted to co-operate with the system of FIG. 1.

The need for a wide range of movements by the pilot will necessitate a versatile design for the pilot's head support system. FIG. 8 shows how the ideal support will be offered to the pilot by directing the forces from the head and torso support wires 2 and 3 in a perpendicular direction back along an axis parallel to that of the aircraft longitudinal axis, and not just back to the centre of the seat, thus ensuring that the support enables the pilot to raise his head without the cable 3 also trying to pull his head back to the centre of the seat head box 80.

In order to achieve this, two constant radius arcs of support 81 and 82 can be defined, one for the head support wire 3 and one for the torso support wire 2. These rcs are defined by the arcs of travel of the connection points of the wires to the pilot's helmet and torso, as he moves his position to look round the side of the seat from his normal sitting posture. The support arrangement should allow the pilot to move within these arcs of travel and still be supported during high g manoeuvres. To achieve this, and at the same time still directing the forces back from the pilot's head in a perpendicular arrangement, it will be necessary to provide a supporting structure that moves in the same arc of travel as the pilot's head (and torso). For the pilot's head, this entails a structure that protrudes from the side of the ejection seat head box to take a position directly behind the pilot's head. Such an arrangement would clearly not want to be permanently projecting from the side of the head box for fear of obscuring the pilot's view during other manoeuvres, and this arrangement could therefore be met by an arm structure 83 that moves out on the required arc of travel 81 when required, but otherwise remained in a retracted position.

The support system may also be adapted to act as a restraint system during emergency ejection. The separation of the cables 2 and 3 from the pilot either when leaving the aircraft or upon ejection the cables to detach cleaning and without snagging any part of the pilot or ejection seat. Those skilled in the art will be able to suggest quick release mechanisms to enable the cables 2 and 3 to disconnect quickly.

Although the head restraint system shown in the example given above comprises a single support cable acting on a point behind the pilot's head and a single cable attached to his torso, and other arrangements are possible without departing from he scope of the invention, for example two parallel cables may be attached to the pilot's torso to improve the pilot's comfort and to also enable the angle of twist of the pilot's torso to be calculated and used to further refine the tensions applied. Furthermore the system could be adapted to support the pilot against forces acting in directions other than vertical downward g forces.

A safety system could be incorporated in the support system so that in the event of an emergency the supporting cables would be automatically severed from the pilot's body and head to avoid the danger of entanglement during ejection.

I claim:

1. A support system for restraining a pilot in an ejection seat of a high speed aircraft, said system comprising:
    a restraining cable having a first end for attachment to the head of the pilot;
    a tension sensor for measuring a tension in said restraining cable;
    a motor-driven tensioning apparatus, attached to an other end of said cable, and adapted to increase the tension in said restraining cable when initiated; and
    control means, connected to receive an indication of said tension from said tension sensor, and to receive signals indicative of G-forces acting on the aircraft, and a position of the pilot with respect to the seat, and having an output connected to said tensioning apparatus, for controlling an amount of tensioning produced by said tensioning apparatus to apply a continuously variable tension to the restraining cable, of a magnitude determined by the G-force, so that in response to G-forces acting on the aircraft, the tensioning apparatus applies a compensating force to said restraining cable.

2. A support system as in claim 1, wherein said control means further comprises means for determining if said signals indicate G-force conditions that are higher than a preset threshold and for only controlling said tensioning apparatus when said threshold is exceeded.

3. A support system as claimed in claim 2 further comprising mounting means attached to said first end of said restraining cable, said mounting means comprising a clasp, slideably mounted on a horse-shoe shaped bracket, said bracket incorporating two pivots which are attachable to opposite sides of a helmet worn by the pilot.

4. A support system as claimed in claim 3 further including a second restraining cable for attachment at one of its ends to the torso of the pilot and being attached at its other end to said tensioning apparatus.

5. A support system as claimed in claim 1 in which said sensor for measuring the tension in said restraining cable is incorporated within said restraining cable and comprises a strain gauge.

6. A support system as claimed in claim 1 in which the sensor for measuring the position of the pilot with respect to the seat comprises means for measuring the extent to which said restraining cable has paid out from said tensioning apparatus.

7. A support system as claimed in claim 5 in which said tensioning apparatus comprises a drum around which said restraining cable is wound, a motor, and a shaft connecting said drum with said motor, and wherein the sensor for measuring the position of the pilot with respect to the seat is a shaft encoder connected to said shaft.

8. A system as in claim 2 further comprising accelerometer means for determining the presence of high G-force conditions to produce said signals.

9. A support system for restraining a pilot in an aircraft, comprising:
    a restraining cable having a first portion which is adapted for attachment to a helmet assembly worn on a head of the pilot;
    tension sensor means for measuring a tension in said restraining cable and producing signals indicative thereof;
    tension controlling means for controlling said tension in said restraining cable;
    accelerometer means for determining the amount of G-force conditions existing on the aircraft, and producing signals indicative thereof; and
    control means, connected to receive said signals indicative of said tension from said tension sensor means, and to receive said signals indicative of G-forces acting on the aircraft from said accelerometer means, for determining if said signals indicate G-force conditions that are higher than a preset threshold and for only controlling said tensioning apparatus to applying a continuously variable tension to the restraining cable, of a magnitude determined by the G-force, when said threshold is exceeded.

* * * * *